W. A. HILL.
BOX PACKING MACHINE.
APPLICATION FILED JAN. 27, 1920.
1,431,399.
Patented Oct. 10, 1922.
8 SHEETS—SHEET 1.
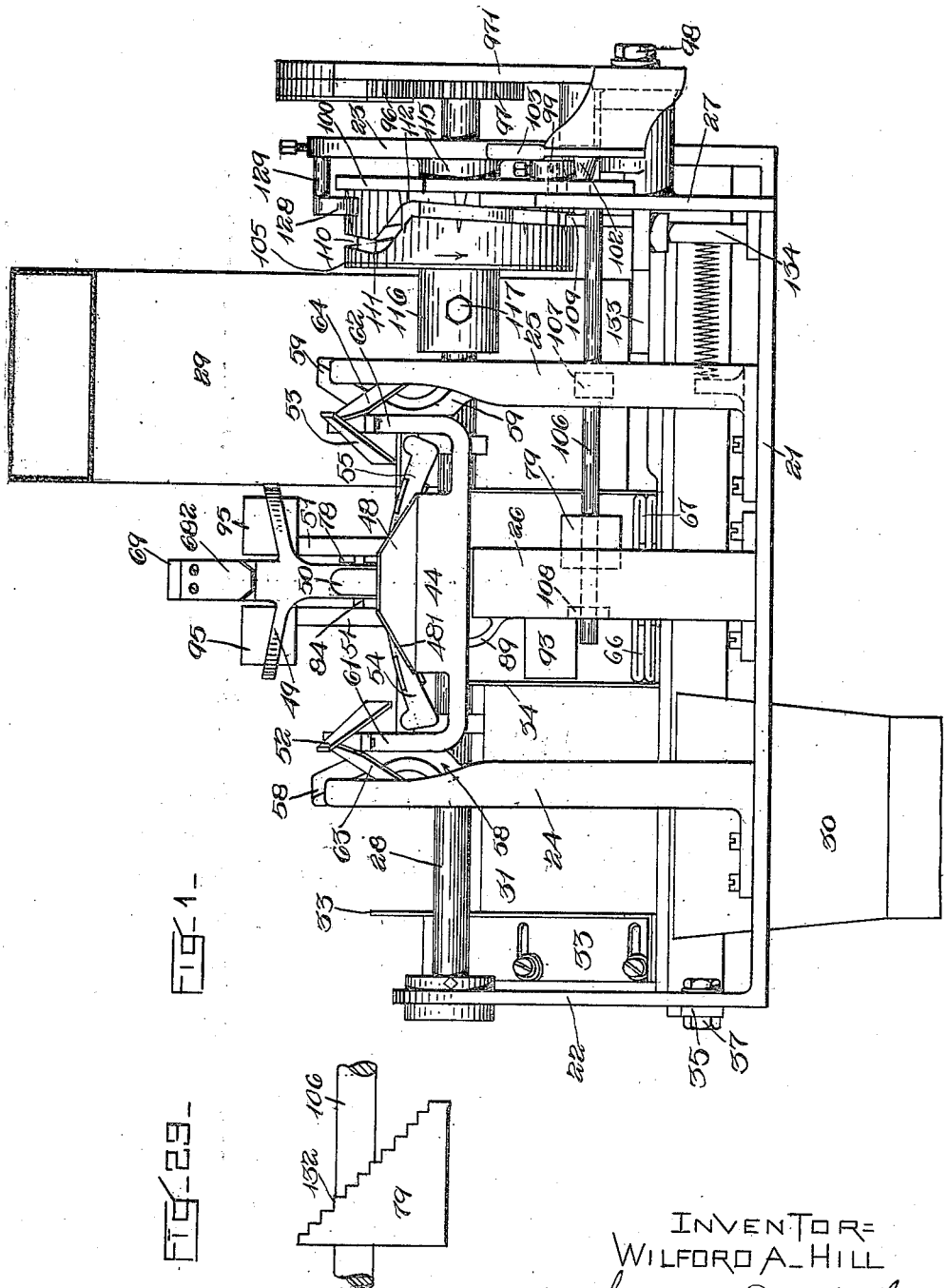
INVENTOR=
WILFORD A. HILL
by Wright, Brown, Quinby & May
ATTORNEYS W. A. HILL.
BOX PACKING MACHINE.
APPLICATION FILED JAN. 27, 1920.
1,431,399.
Patented Oct. 10, 1922.
8 SHEETS—SHEET 2.
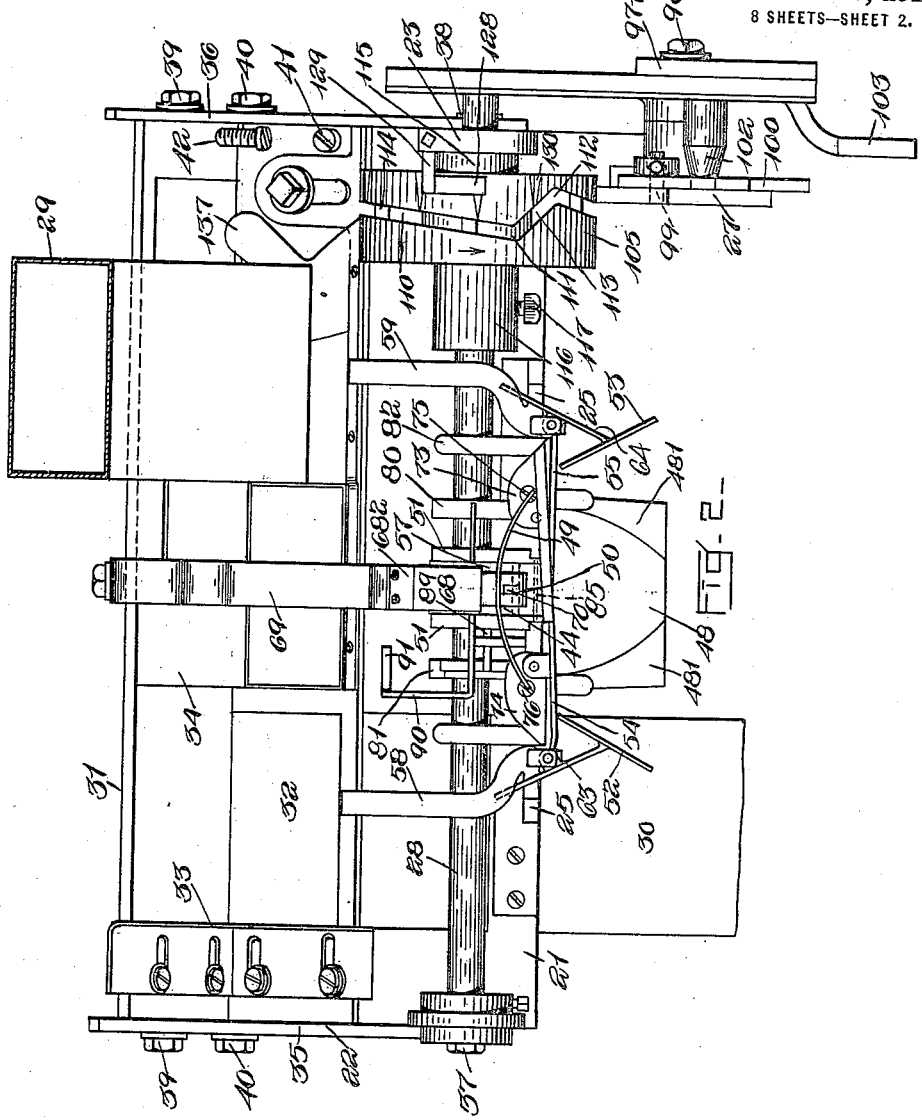
INVENTOR:
WILFORD A. HILL
by Wright, Brown, Quinby & May
ATTORNEYS

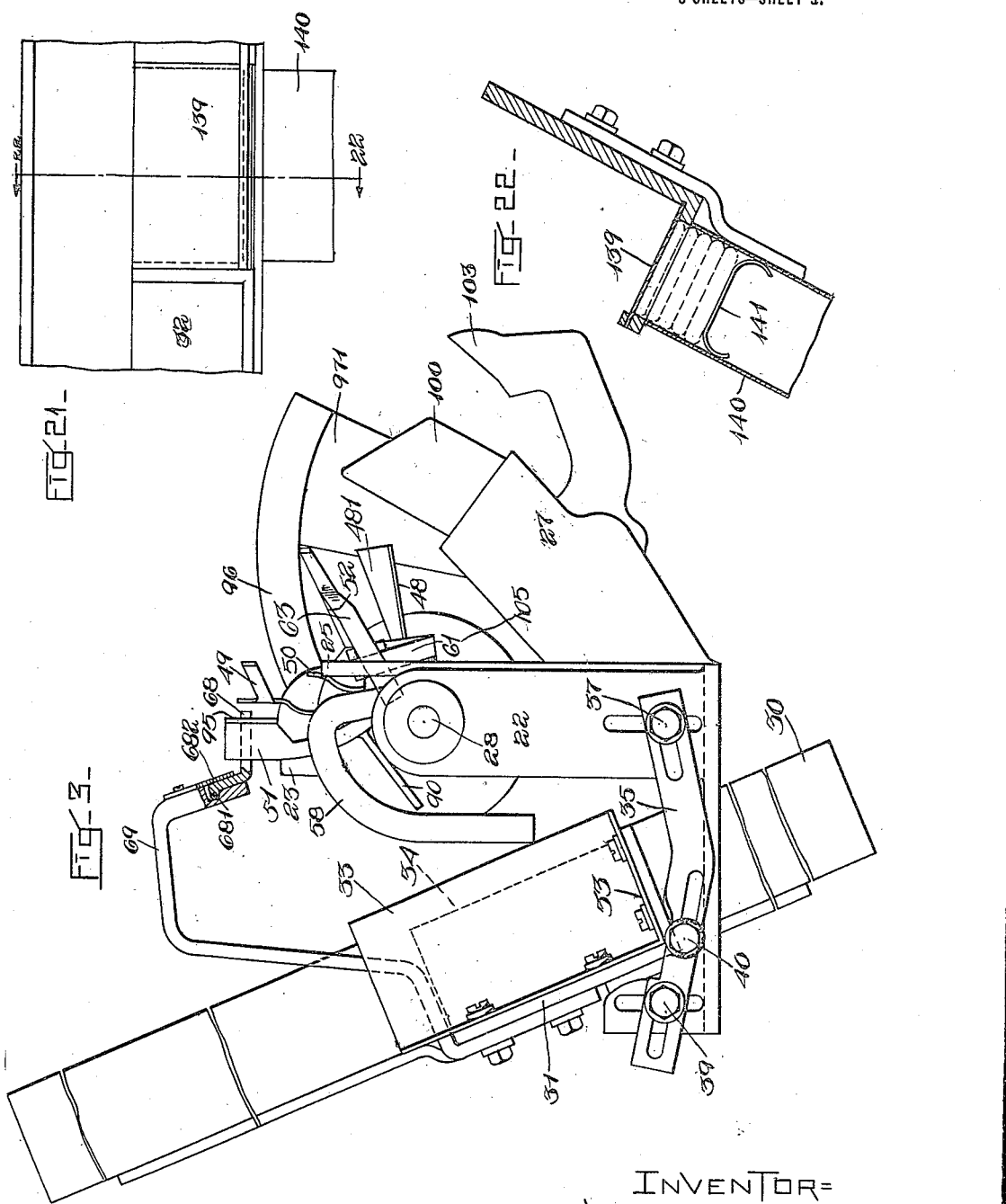

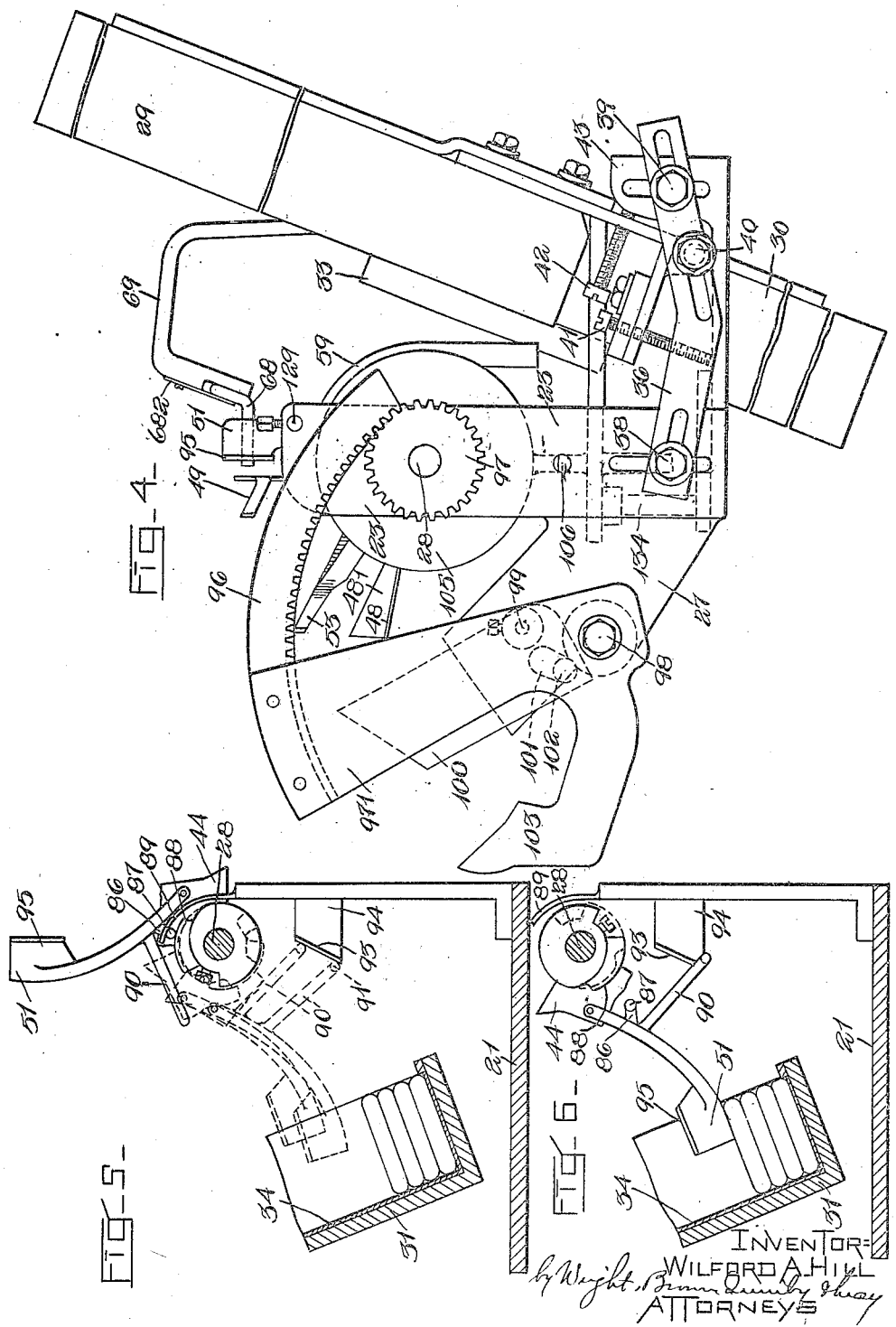

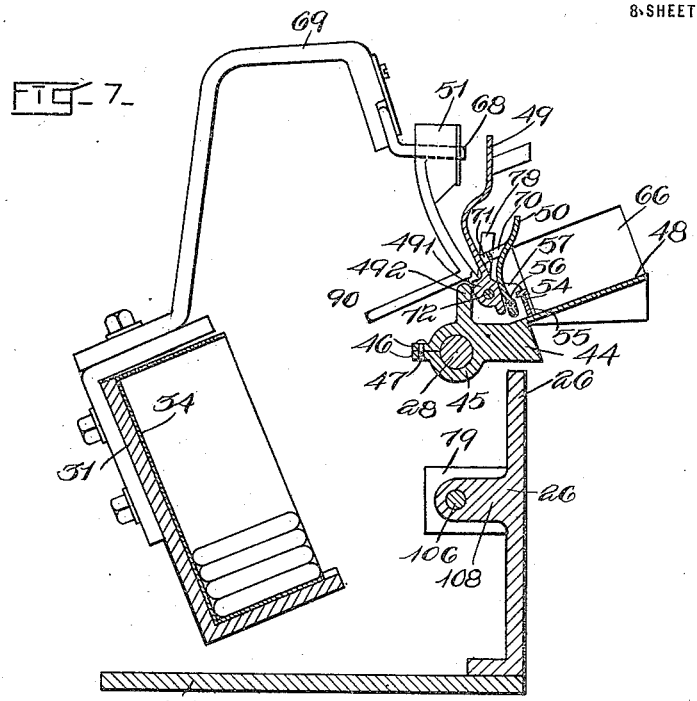
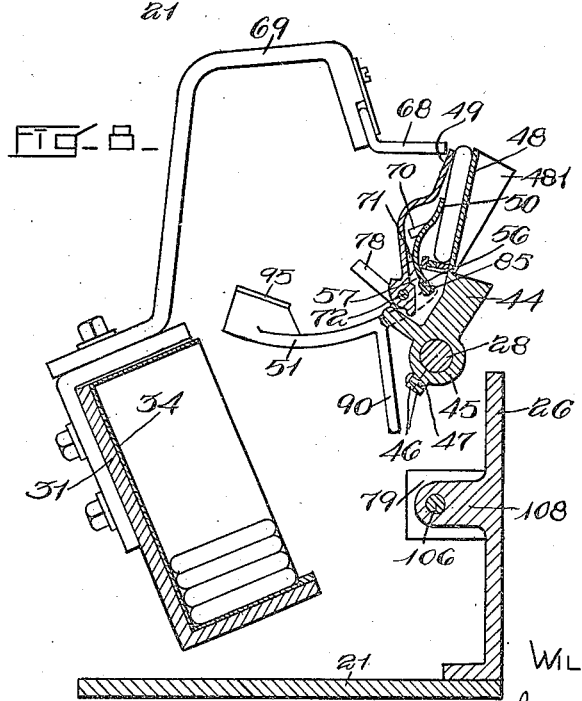

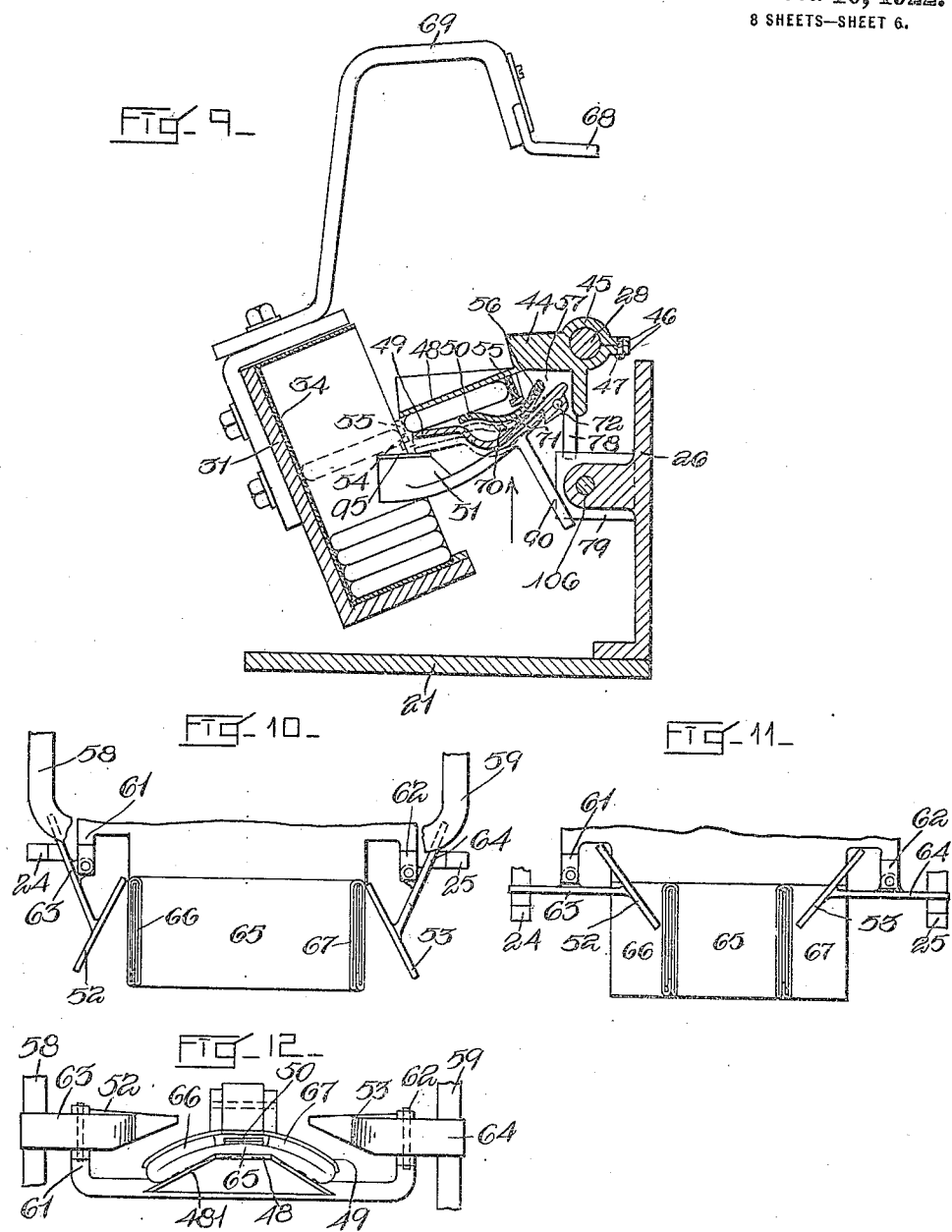

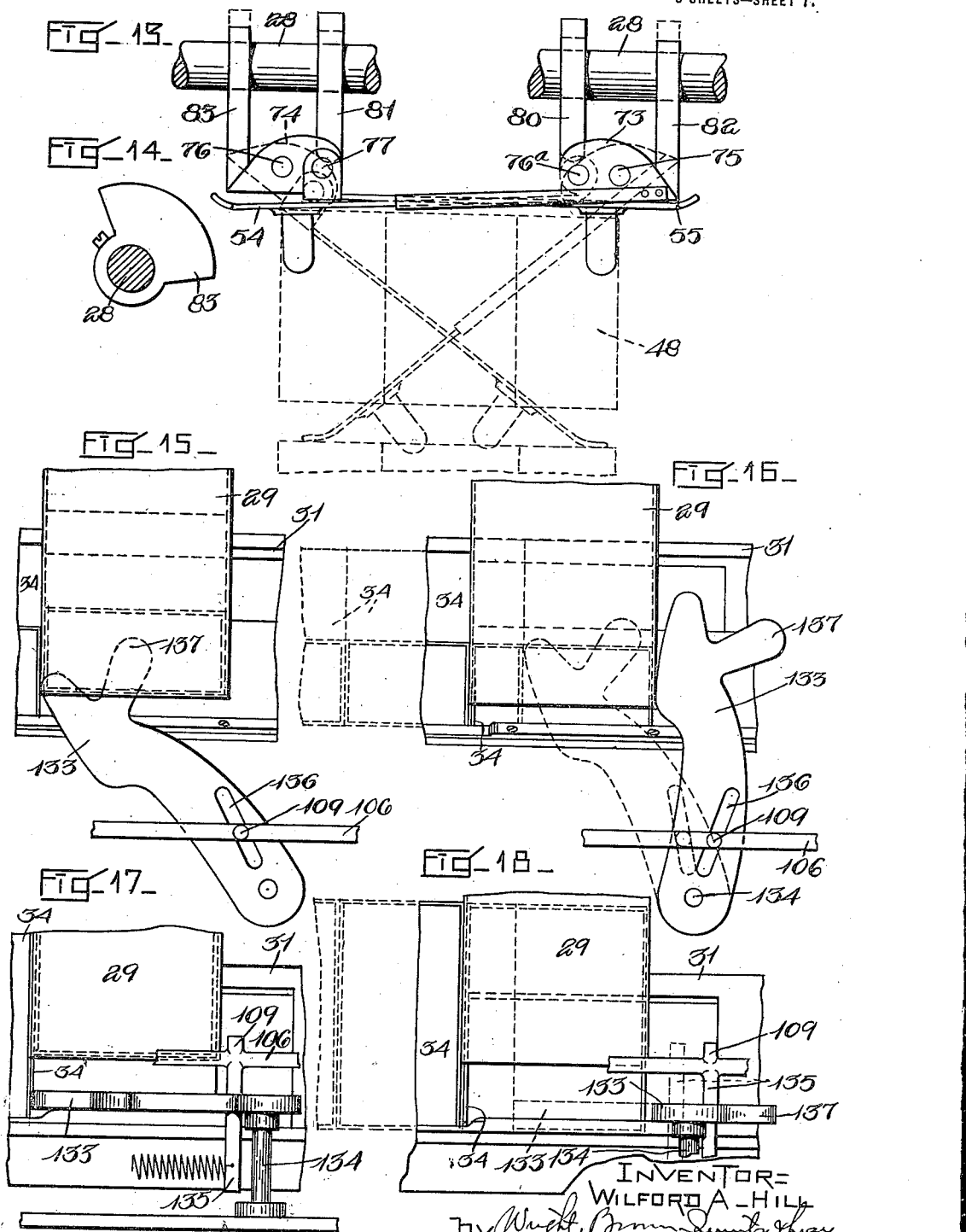

W. A. HILL.
BOX PACKING MACHINE.
APPLICATION FILED JAN. 27, 1920.
1,431,399.
Patented Oct. 10, 1922.
8 SHEETS—SHEET 8.
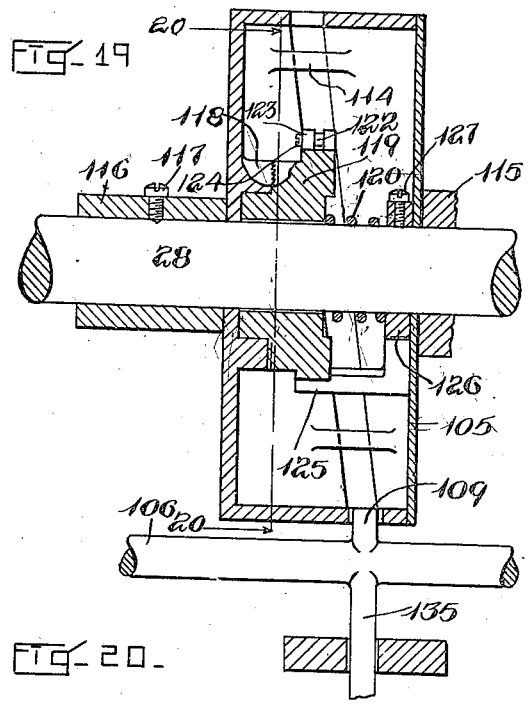
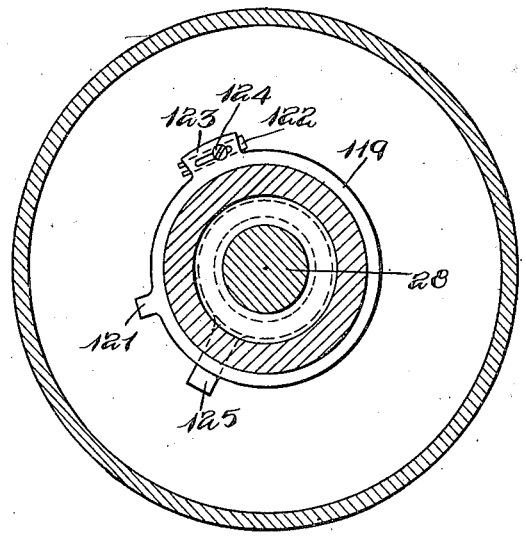
INVENTOR=
WILFORD A. HILL
by Wright, Brown, Quinby & Shay
ATTORNEYS Patented Oct. 10, 1922.

1,431,399

UNITED STATES PATENT OFFICE.

WILFORD A. HILL, OF WALTHAM, MASSACHUSETTS.

BOX-PACKING MACHINE.

Application filed January 27, 1920. Serial No. 354,407.

*To all whom it may concern:*

Be it known that I, WILFORD A. HILL, a citizen of the United States, residing at Waltham, in the county of Middlesex and State of Massachusetts, have invented new and useful Improvements in Box-Packing Machines of which the following is a specification.

The object of the present invention is to provide a machine for packing distinct articles or pieces in boxes or other containers. My object has been primarily to provide a machine of this general nature which shall be completely automatic in all of its actions. My specific object has been to make possible the automatic packing in boxes of a given number of folded paper packets containing medicinal powders, such packets as are sold by purveyors of drugs, wherein the container for the powder is a folded paper wrapper of which the ends are doubled back. I have had in view also to provide a machine capable of handling the product of the powder folding or wrapping machine described in my patent granted February 12, 1916, and numbered 1,172,209, taking the folded packets as they are delivered by the folding packets as they are delivered by the folding machine and placing them one by one in a box. The herein described and illustrated embodiment of my invention has been designed with that object prominently in view, and it is therefore particularly adapted for dealing with this particular sort of packet or article. The principles involved in the invention, however, are not restricted to this particular use or to the particular embodiment of means described in this application, or even the entire combination of all of the elements so shown, but are applicable to any use which requires the filling of a container by separately placing in the container a number of articles of any nature.

In its more general aspects my invention provides a means for placing articles one after another in a box, counting the articles, removing the filled box when a predetermined number of articles have been placed therein and substituting an empty box in position for filling. For the specific purpose of dealing with folded packets, the invention contemplates the provision of means adapted especially for holding packets of the sort hereinbefore indicated and securing the doubled over ends thereof.

The drawings represent a machine which I have constructed in which the principles of the invention are contained.

Figure 1 of the drawing is a front elevation of the machine.

Figure 2 is a plan view thereof.

Figure 3 is an end elevation as seen from the left.

Figure 4 is an elevation of the machine as seen from the right.

Figures 5 and 6 are views showing partly in section and partly in elevation the means for packing the articles in the box, showing such means in different positions.

Figures 7, 8, and 9 show in vertical section the means for grasping or holding the article being handled, the receiving box, and associated parts, in different positions.

Figures 10, 11, and 12 show the package gripping and holding devices in plan view and in three different stages of their operation.

Figure 13 is a detail plan view of the means for displacing the articles operated upon from the carrier into the box.

Figure 14 is a side elevation of a detail thereof.

Figures 15 and 16 are plan views of the device for placing empty boxes in filling position, showing such means in two of the different positions which it is designed to occupy.

Figures 17 and 18 are front elevations of the parts shown in Figures 15 and 16, respectively.

Figure 19 is an axial section of the cam used for operating the escape and feeding means for the boxes and for counting the articles packed.

Figure 20 is a cross section of the same.

Figures 21 and 22 are respectively a plan view and a vertical section of a modification.

Figure 23 is a plan view of a detail of the machine.

The machine frame includes a base 21 adapted to be mounted on a bench or table and having uprights 22, 23, 24, 25, and 26, and a forwardly projecting bracket 27. The uprights 22 and 23 support the bearings in which an operating shaft 28 is rotatably mounted. The base has a rear extension which supports a magazine 29 for the boxes to be filled, a chute 30 for conducting away the filled boxes and a guideway and holder 31 for the box being filled. The supply magazine is at one side of the filling position and the discharge chute at the other side of this position, and the guideway 31 extends horizontally from the bottom of the magazine 29 to the top of the chute 30. This guideway is L shaped in cross section and placed on a backward slant so that the boxes are securely held therein by gravity and are also held in a convenient position for filling. The magazine has an opening in its side next to the guideway so that the bottom box in a pile of boxes contained therein may be pushed out into the filling position. The guideway extends over the upper end of the receiving chute and has an opening 32 in its bottom over such end so that a box shifted thereover may drop into the chute. A gage plate 33 is secured to the back wall of the guide in position to arrest a box over the entrance opening to the chute and prevent its being propelled beyond such opening. The distance between the adjacent side of the magazine and the chute is approximately equal to the width of a box, whereby the movement of an empty box from the magazine into position for filling displaces the previously filled box to a position over the opening 32 and the discharge chute. The box to be filled is represented at 34. Bars 35 and 36 at the ends of the frame which are connected adjustably by bolts 37 and 38 to the uprights 22 and 23, respectively and to the rear extension by bolts 39, and are connected to lugs on the L shaped guide by bolts 39, 40, provide for adjustment up and down and also angularly of the guide and of the box to be filled. As the empty box container and the discharge chute are immovably secured to the guide they are adjusted therewith. Set screws 41 and 42 which bear on the base and on a lug 43, respectively, enable the adjustment to be accurately regulated and made permanent.

Shaft 28 carries and operates the packing elements and the counting and box feeding devices. A carrier 44 is mounted on the shaft frictionally by means of a strap or hub portion 45 which surrounds the shaft and has ears 46 clamped together by a screw 47. The friction may be regulated to that degree which permits the shaft to slip within the carrier when movement of the latter is rigidly resisted, but holds the carrier firmly enough to give it the required motions. In the present machine, the carrier is specially constructed for handling folded powder packets and to that end is equipped with a forwardly projecting plate 48 on which the packets are placed, and with a co-operating gripper 49 between which and the plate 48 the packets are grasped. The carrier is transferred by rotation of the shaft from its forward receiving position shown in Figures 1 to 4 and 7 to a rear delivering position shown in Figure 9. The co-operating plate and gripper hold the packet while being so moved and inverted. The carrier also carries a preliminary gripper 50, a packer 51, end fold benders 52, 53, and pushers 54, 55.

The preliminary gripper 50 is pivoted on a pin 56 which extends between lugs or wings 57 on the carrier. It is arranged to co-act with the central part of the carrier plate 48 in holding the packet or powder paper while its ends are being bent over. The benders or wipers 52, 53 are provided for laying down the ends of the packet so that such ends may lie between the plate 48 and the complemental gripper 49. In packages of the sort indicated, that is those having their ends doubled back, there is a tendency for the doubled back ends to spring away from the body of the packet on account of the stiffness and resilience of the paper, somewhat as indicated in Figure 7 where 66 represents the nearer end of a packet which has been placed on the carrier. If the ends were allowed to stand up in this manner the gripper 49 would be liable to bend one or both of them outward instead of inward and so cause them to project beyond the edges of the box and prevent the packet from entering the box. The wipers 52 and 53 prevent this result by bending the ends of the packet against the middle so that they will be held down by the gripper 49.

The wipers are thus operated during the travel of the carrier by stationary cams 58 and 59 which spring from the uprights 24, 25, respectively, and thence extend partly around the shaft 28, being at the same time offset axially of the shaft. The wipers, which are pivoted to arms 61, 62 on the carrier have operating arms 63, 64 which lie against the outer faces of the cams 58, 59, respectively. As the carrier swings from its forward to its rear position the wipers are moved inwardly toward the middle of the carrier, bending down the upstanding ends of the packet. The action is illustrated in Figures 10, 11, and 12. In Figure 10 the packet 65 with its upturned ends 66, 67 has just been placed on the carrier and the wipers are spread apart to admit it. Figure 11 represents the relation of the wipers to the carrier after the latter has commenced its motion and the wiper actuating arms 63, 64 have been carried along their respective cams. The figure shows the carrier and the wiper as though they had remained in the same place and the cams 58 and 59 had been rotated forwardly about the shaft. Figure 12 shows the parts after the carrier has been brought substantially into the position shown in Figure 8, the wiper operating arms have been brought to the highest points of their respective cams and the wipers carried beyond the location of the packet. The ends of the packet are laid close against the middle and there held by the gripper 49. It will be seen from Figure 1 that the gripper has a narrow central part and lateral arms or branches which are so placed that the wipers may pass under them, and the wipers further are so placed that they pass by the central part of the gripper without touching it. Thus the wiped over ends of the packet may be engaged by the gripper before being released from the wipers. This action takes place during the first part of the movement of the carrier, but before it occurs the preliminary gripper 50 is caused to bear on the central part of the packet. This gripper is operated by the main gripper 49, which latter in turn is operated by finger 68 on an arm 69, which rises from the box holder. The finger 68 points forwardly just back of the normal position of the gripper 49 and holds the latter stationary during the first part of the movement of the carrier. The preliminary gripper has a shoulder or abutment 70 which bears at this time against a complemental shoulder or abutment 71 on the main gripper, whereby it also is held stationary when the carrier begins to move. Thus the movement of the carrier brings the packet against the preliminary gripper before the wipers begin to act, and the latter are prevented from displacing the packet.

As the gripper 49 is pivoted on a different axis from the gripper 50, namely by a pin 72 held in the wings 57 of the carrier, and the distance from the pivot 56 to the shoulder 70 is greater than the distance from pivot 72 to shoulder 71, shoulder 70 is displaced from shoulder 71 by the time the main gripper comes into action. The latter is held stationary while the carrier plate 48 advances toward it until pivot 72 passes the line between the shaft 28 and the end of finger 68, whereupon the gripper is drawn down and under the finger. Thereafter the grippers are held only frictionally in the gripping position, but are held securely enough nevertheless to retain the packet as the carrier comes into the inverted position shown in Figure 9.

When in delivering position (Figure 9) the packet is displaced from the carrier by the pushers 54, 55 which are long arms carried by holders 73, 74, respectively, the latter being pivoted to the carrier by pivots 75, 76. The pusher arm 54 is pivoted to the holder 73 by a pivot pin 76$^a$ (Fig. 13) on which it is fitted tightly enough to provide some friction. Similarly pusher arm 55 is frictionally pivoted to the holder 74 by a pivot pin 77. These pusher arms lie back of the position of the packet. They are relatively narrow so that their combined width is no greater than the thickness of the packet and are close together in order that both may act quickly upon the packet to displace the same from the carrier.

When the carrier arrives in the discharging position it is arrested by a finger 78 which it carries coming into contact with a stop 79 to be later described. Then the shaft continues to rotate, as it is permitted to do by the frictional mounting of the carrier, and cams 80, 81 on the shaft bear against the holders 73, 74, respectively, and force them into the dotted line position shown in Figure 13, thereby swinging out the pusher arms and pushing the packet into the box. On the return of the shaft, the carrier turns with it until arrested by coming in contact with the upright 26, whereupon continuing movement of the shaft brings cams 82 and 83 against the pusher holders and returns the pusher arms to normal position. The cams 80 and 82 are on opposite sides of the pivot 75 of pusher arm holder 73, and the same is true as to the location of the cams 81 and 83 with respect to the pivot 76 of holder 74. When the carrier returns to receiving position, the gripper 49 is opened, that is, moved away from the package supporting plate 48, upon striking the finger 68. When fully opened a shoulder 491 on the bottom part of the gripper strikes an abutment 492 on the carrier and makes the gripper rigid, thereupon the gripper passes under the finger into a position in front thereof, as is permitted by the mode of mounting the finger. Referring to Figure 3, it will be seen that the finger is pivoted to the arm 69 at 681 and that it is bent so as to provide a firm bearing on the end of the arm. A spring plate 682 overlies the finger near its pivot. Thus the finger is rigid to close the gripper on the package and is yielding to admit the gripper to pass it into forward movement after having been opened.

The frictional pivot mounting of the pusher arms on their holders is provided in order that the pushers may not be bent or broken when striking the edges of the box. Some parts of the box, for instance, the bottom and top ends, are more remote from the carrier than are other parts, but the pushers are given enough movement to displace the packet fully into the box when placing one at either end. This movement is greater than necessary to place a packet in the box when the carrier stops near the middle part thereof, wherefore in the latter position the pushers strike the edges of the box. They are adapted to yield at their friction pivots, however, without being injured or injuring the box. Upon every return the pushers are straightened with respect to their holders by striking against the rigid parts of the carrier. It will be noted that the supporting plate 48 is bent down at its opposite ends 481, or in other words that it is offset or bent out of a straight line in the longitudinal direction of the package; and also that the gripper 49 is complementally curved or bent. Thereby the package or article gripped between them is bent, substantially as shown in Figure 12. By this means the distance between the ends of the package is shortened and it is made easier to insert the package in the box. A package fully as long as the width of the box may thus be inserted.

The packer 51 is provided for pressing down the packets in the lower part of the box and providing ample space below the upper edge of the box for admission of other packets up to the full number provided for. Said packer is composed of two arms rigidly joined together by a crossbar 84 (Fig. 1), which are pivoted to the central rear part of the holder on an axis 85, (Figure 8). One of the arms of the packer carries a short lug 86 (Figs. 5 and 6) with a stud 87 which bears on the cam 88, the latter conveniently being part of the same piece which forms the cam 81. This cam normally holds the packer elevated in the position shown in Figures 5 and 7. A curved finger 89 passes from the fixed upright 26 and is curved rearwardly so as to lie over the stud 87. The purpose of this finger is merely to restrain the packer, preventing it from jumping away from the cam by inertia when the carrier is first moved. The packer also carries a longer projection 90 with a stud 91 which co-acts with a stationary cam plate 93 (Figures 5 and 6) to guide the end of the packer into the box. After the carrier has advanced to the point where the packer is no longer supported by the cam 88, which is reached when the pivot 85 has been carried somewhat beyond the position above the operating shaft 28, the finger 91 comes into contact with the cam 93, the effect of which is to arrest the packer so that it does not continue to swing with the shaft 28 but the continuing movement of the carrier causes it to turn about its shifting point of support upon the cam, whereby the outer end of the packer is moved away from the shaft and caused to enter the box. If it were not for this cam, when the box is empty or only a small proportion of the packets have been placed therein, the packer would pass out of the box after entering it without holding down the package therein. The purpose of the cam and its co-operating finger is solely to prevent the packer from being withdrawn from the box when the box is nearly empty. Before the packer is returned with the carrier, the continuing movement of the shaft previously mentioned has carried the end of cam 88 beyond the stud 87 so that the packer is returned at a path in front of that at which it advanced, the return path being entirely outside of the box. The finger 91 then passes in front of the cam plate 93, which is a thin plate laterally offset from the bracket 94 on which it is mounted. The arm 90 carrying finger 91 passes by the end of the cam plate. The continuing movement of the operating shaft after the carrier has returned to normal position brings the cam 88 under stud 87 again and restores the packer to the condition from which it will enter the box upon the next advancing stroke. The packer has broad flat top plates or surfaces 95 over which the packet is guided when entering the box, as shown in Figure 9.

The operating shaft 28 is given an oscillating movement through less than a complete rotation. It is so oscillated by an actuating gear segment 96 in mesh with a pinion 97 on the shaft, such segment being secured to an arm 971 pivoted at 98 on the bracket 27. Pivoted at the point 99 is an operating arm 100 which has a slot with a cam surface 101 into which enters a stud 102 carried by the arm 971. The cam surface 101 is so inclined to the radius of the segment in which the stud 102 is located that, when the actuating arm is moved downward and to the left with respect to Figure 4 through the prescribed distance, the arm 971 and segment 96 are swung through an arc great enough to give the extent of rotation to the shaft 28 already described. A returning arm 103 is made rigid with the segment carrying arm 971, and is so arranged that its movement in the same direction as that just described of the arm 100 imparts the opposite direction of movement to the gear segment to that imparted by the arm 100. The arrangement of these two arms is preferably such that they may be engaged and moved in succession by any operating element, such as a stud on the cam or fly wheel of my powder folding machine, previously referred to. These particular actuating arms are merely illustrated and described to show a construction adapted for use in connection with my powder folding machine. It is to be understood that I do not limit my invention in regard to the actuating means any otherwise than as expressly stated in the claims.

The operating shaft 28 carries a cam 105 which serves to control the point at which the carrier stops with relation to the box in order to place articles in the latter, and also operates a feeder for removing filled boxes and placing empty boxes in the filling position. To accomplish these ends the cam operates a rod 106 which is adapted to slide endwise horizontally through guides 107 and 108 on the uprights 25 and 26, respectively, and the outer end of which passes through a guiding opening in the upright 23. This rod carries a stud or pin 109, which projects into the groove of the cam and is operated by the latter. Such groove is formed in the periphery of the cam and consists of a substantially helical portion 110 passing almost completely around the cam from a starting point 111 to a finishing point 112, and a short and comparatively abruptly inclined connecting part 113 from point 112 to point 111. The cam is loosely mounted on the shaft and is given a step by step movement relatively thereto in the direction of the arrow on Figures 1 and 2. Before describing the effects produced by the cam I will describe the cam itself and its relation to the shaft, referring particularly to Figures 1, 2, 19, and 20. It will be seen that the cam is a hollow shell having a cam track in its periphery, or in other words, in its cylindrical wall. The two parts of the shell thus divided by the endless cam track are rigidly united by cross members 114. The cam is positioned on the shaft between a boss 115 on the upright 23 and a sleeve 116, which is clamped to the shaft by set screw 117. On the interior of one end wall or head of the cam is an annular rib or boss 118 forming one half of a ratchet clutch with inclined teeth in its end face. The other member of the clutch is a collar 119 having complemental teeth which is loosely mounted upon shaft 28 and is pressed toward the clutch member 118 in a yielding manner by spring 120. This clutch collar has abutments 121 and 122, the latter being adjustable, being formed as a plug set into a socket 123 which is formed on the periphery of the clutch collar and being secured in such socket by a clamping screw 124. The manner in which the abutment 122 is mounted permits of adjustment tangentially of the clutch collar, that is, angularly about the axis thereof, whereby such adjustment varies the angular distance between the abutments 121 and 122. A finger of pusher 125 extend between the said abutments, being carried by a collar 126, which is fixed adjustably upon the shaft 28 by a set screw 127. A stop pawl 128 bears on the exterior of the cam to exert a yieldable restraint to the rotation of the cam. This pawl is conveniently a spring strip which is secured to a post 129 mounted to the upright 23 and presses resiliently against the periphery of the cam, being adapted to enter notches 130 (Fig. 2) in such periphery. The walls of such notches are inclined so that when a sufficiently powerful effort is made to turn the cam the holding pawl is forced out of the notch with which it may be engaged and the cam permitted to turn. The pawl, however, is strong enough to hold the cam stationary while the clutch collar 119 turns in the direction away from the abrupt faces of its clutch teeth. In consequence at each oscillation of the shaft which carries the packet carrier from receiving to discharging position, the pusher finger 125 strikes the abutment 121 and turns the clutch collar relatively to the complemental clutch rib 118, the cam meanwhile standing still. On the return oscillation of the shaft the pusher finger strikes the other abutment 122 and turns the clutch collar in the direction in which the ratchet clutch teeth face, thereby applying a positive impulse to the cam which causes the latter to displace the yielding stop pawl 128 and to turn. The angular distance between the abutments 121 and 122 is enough less than the angle of oscillation of the shaft to cause the cam to be turned through a determined angle on each return of the shaft. This angle or step may be exactly regulated by adjustment of the abutment 122 so that the cam may be caused to turn through any desired fractional part of a rotation at each step.

Rod 106 carries the stop 79 of which the rear side is provided with a series of steps 132; or in other words, different points of such rear side are at different distances from the rod. These steps or points are brought successively in the path of the stop finger 78, previously described as being on the packet carrier. When starting to fill an empty box, the stop is at its most advanced position to the left, with respect to Figures 1 and 2, whereby the lowest shoulder of the stop is in the path of stop finger 78. Thus on its first trip the carrier is given the greatest amount of movement and is brought near to the bottom of the box. On each return trip the stop is shifted one step to the right and other steps or points on the stop successively in rear of the preceding points are opposed to the stop finger, whereby at each successive trip the carrier is carried less far around than on the previous trip and is thereby enabled to deliver each packet into the open space of the box above the package previously delivered.

The feeder for the boxes is an arm 133 (Figs. 15, 16 and 19) which is pivoted on a post 134 wh'ch rises from the base 21, and projects to the rear over the bottom member of the box guide 31. This arm is adapted to pass under the open bottom of the magazine 29. It is actuated by a stud 135 carried by the rod 106 beneath and in line with the stud 109 and passing through a slot 136 in the arm. The arm is so proportioned and placed that the movement of stud 135 from one extreme position to the other shifts the arm from the position shown in Figure 15 to that shown in Figure 16, in the first of which positions its end passes slightly beyond the delivery side of the box magazine, and in the other of which its end is wholly outside of the prism of the magazine. The arm is further so formed, having a branch 137, that a part of it always extends under the column of boxes in the magazine, except when in the extreme retracted position shown in Figure 16. When the cycle of operations of filling an empty box begins, the feeder arm is in the position Figure 15. Thence it is shifted with each step of the cam toward the position Figure 16, finally arriving at that position when the last package has been placed in the box. The feed arm is then displaced from under the column of boxes, which is allowed to drop until the lowest box rests on the bottom plate of the guide. Thereafter the step movement of the cam following placing of the last package in the box brings the short offset part 113 of the cam track into action upon the rod 106, and suddenly shifts the feed arm from position Figure 16 to that of Figure 15, shifting the bottom box of the pile in the magazine to filling position and at the same time displacing the filled box to the discharge chute 30. Upon removal of the bottom box the column in the magazine falls until the next box in the pile rests on the feed arm and becomes in its turn the bottom of the pile.

Figures 21 and 22 illustrate a modification which permits the packets to be placed in a chute instead of in boxes. In this modification that part of the guide which is adapted to support the box in filling position is formed of a removable slide 139 overlying the open end of a chute or tube 140, which slide, being removed, enables the packets to be placed directly in the chute. 141 is a yielding bottom constructed to exert spring pressure against the sides of the chute 140 and to be displaced under the pressure applied on the column of packets by the packer. An indefinite number of the packets may be placed in this chute, to be removed when needed for dispensing. When the articles are packed in this container the cam 105 may be dispensed with or put out of operation.

In the following claims the term "box" is intended to include any sort of container into which packets of the sort indicated, or other articles, may be packed. The term "packet" or "package," except where expressly qualified by words is intended to include any article capable of being packed by machines embodying my invention. Wherever I refer to placing articles singly or individually in boxes, etc., I do not thereby intend to exclude placing two or more units in the box at one operation; in such case a single load of the carrier, conceivably consisting of two or more individual articles, is considered as the unit operated on.

What I claim and desire to secure by Letters Patent is:

1. A box packing machine comprising a support for the box to be filled, a packet carrier having an extended surface whereon the packet may lie, means for transferring said carrier from a receiving position to a discharging position adjacent to the box, a packet displacer carried by said carrier and movable to sweep over said surface, and means for so moving the displacer toward the box when the carrier is in discharging position.

2. A box packing machine comprising a carrier movable angularly about a substantially horizontal axis from a receiving position to a discharging position, a holder for a box arranged to support a box with its open side in such a position adjacent to the discharging position of the carrier that the latter in arriving at discharging position travels over such open side toward an end wall of the box, means arranged and operable to displace the packet from the carrier into the box, and stopping means operable to arrest the carrier on successive trips at different positions progressively more distant from said end wall.

3. A box packing machine comprising a box holder, a carrier adapted to transport articles into a position adjacent to the opening of the box, means for transferring the load of the carrier therefrom into the box, and means for arresting the carrier in different discharging positions as the number of articles placed in the box increases.

4. A box packing machine comprising a box holder, an operating shaft, a carrier mounted frictionally on said shaft and movable by oscillation thereof between a discharging position intermediate the shaft and the box and a receiving position on the opposite side of the shaft from the box, a stop for arresting the carrier in discharging position, pushing means on the carrier adapted to discharge the article carried thereby from the same, and means operated by continuing movement of the shaft after arrest of the carrier for so actuating said pushing means.

5. A machine for packing articles in boxes comprising a support arranged to hold an open box with its open side extending at an inclination to the vertical, a packet carrier movable from a receiving position relatively remote from the box to a discharging position near the open side of the box, means arranged and operated to displace a packet from the carrier when the latter is in discharging position, thereby entering the packet in the box, and a presser arranged to enter the box in advance of the discharge of the packet and to bear on articles already in the box, whereby to provide space to receive the article about to be placed in the box.

6. A box packing machine comprising a support for a box arranged to hold such box with its open side exposed, a carrier having means for grasping the articles to be packed, automatic means for moving said carrier into discharging position adjacent to the open side of the box and means for displacing the article from the carrier into the box.

7. In a machine for packing boxes, a carrier, an oscillative shaft on which said carrier is mounted and by which the same is movable from a receiving position into a discharging position, means for holding the box to be filled adjacent to the discharging position of the carrier, and a packer loosely held by the carrier arranged to enter the box and to press down on articles already therein to provide space for reception of the article carried by the carrier.

8. In a box packing machine, a carrier having means for supporting articles to be packed, a gripper carried by said carrier and operable to press against the articles so supported, means for moving said carrier from receiving position to discharging position, a pusher for displacing articles from the carrier, and means for actuating said pusher for that purpose when the carrier is in discharging position.

9. In a packing machine, a shaft, a carrier frictionally secured upon said shaft whereby yieldingly resisted relative movement between the carrier and shaft is permitted, a pusher mounted upon the carrier adapted for displacing therefrom the articles carried thereby, means for arresting the carrier in discharging position, and means operated by continuing movement of the shaft for actuating said pusher to displace the article to be packed from the carrier.

10. In a packing machine, an oscillative shaft, a packet carrier mounted on said shaft and frictionally secured thereto whereby to permit movement of the shaft relatively to the carrier when movement of the latter is resisted, a package displacing device movably mounted on the carrier, and a cam fixed to the shaft and arranged to actuate said device when movement of the shaft relatively to the carrier occurs.

11. A packing machine comprising an oscillative shaft, means for rotating the shaft first in one direction and then in the opposite direction, a packet carrier frictionally secured to said shaft in a manner permitting movement of the shaft relatively thereto when the carrier is arrested, a packet displacing device, a holder for said device pivoted on the carrier, and cams fixed upon the shaft adjacent to said holder at opposite sides of the pivot thereof, one of said cams being arranged and operable to move said holder and the pusher in a manner to displace the packet by continued movement of the shaft after arrival of the carrier in one position and the other cam being arranged to return the holder and pusher by continuing movement of the shaft after arrival of the carrier in another position.

12. A packing machine adapted to place folded powder papers in boxes comprising a carrier having a support for such a package, a preliminary gripper adapted to secure a package on said support, means for laying the ends of the package against the body thereof on the support, a second gripper arranged to hold the folded-back ends of the package against the body thereof, and press the latter against the support, and a displacing device for removing the package from between the support and grippers into a box.

13. A packing machine adapted to place folded powder papers in boxes comprising a carrier having a support for such a package, a preliminary gripper adapted to secure a package on said support, means for laying the ends of the package against the body thereof on the support, a second gripper arranged to hold the folded-back ends of the package against the body thereof, and press the latter against the support, and a displacing device for removing the package from between the support and grippers into a box, said support and the last-named gripper being complementally bent out of a straight line in the longitudinal direction of the package to shorten the latter and make easier its entrance into the box.

14. A machine for placing paper wrapped powder packets in boxes, comprising a carrier having a support for such a package, means for bending the ends of the package against the body thereof while on said support, a gripper for holding such ends against such body and pressing the entire package against the support and means for transferring said carrier from receiving position to discharging position.

15. A machine for packing powder packages in boxes, comprising a movable carrier having a supporting portion adapted to hold a paper wrapped powder package, a shaft on which said carrier is mounted movable to transfer the latter into discharging position, bending devices mounted upon the carrier and operable during the first part of such movement to bend the ends of the package toward the middle part thereof, a gripper operable during the further movement of the carrier for pressing the ends of the package against the middle thereof and holding the package on the support, and means for holding an open box adjacent to the final position into which said carrier is so moved.

16. In a powder package packing machine, a carrier having a package supporting portion, a shaft on which the carrier is mounted with provision for yieldingly resisted relative movement, displacing devices mounted on the carrier adjacent to the inner limit of such portion and movable outwardly therefrom, and means carried by the shaft for so moving the same to eject the package upon continuing movement of the shaft after arrest of the carrier.

17. A machine for placing powder packets in boxes comprising a carrier having a packet supporting portion, benders mounted on said carrier movable across said portion from opposite limits thereof toward one another, stationary means for so moving said benders during the travel of the carrier, a gripper for holding the packet upon said portion, and a stationary actuator for said gripper operable to close the same upon the supporting portion during continuing movement of the carrier.

18. In a packing machine, the combination with a box holder of a packer, an oscillative carrier to which said packer is pivoted, means for so moving said carrier as to carry the packer into the box and toward one wall thereof, and a guide for restraining the free movement of the packer whereby movement of the carrier causes the same to enter the box.

19. In a box packing machine, a holder for a box, an oscillative shaft, a carrier mounted on said shaft, a packer pivotally hung on said carrier, the shaft and carrier being arranged relatively to the box holder so that, by oscillation of the shaft, the packer is swung from an elevated position downwardly toward the open side of the box, and means for arresting the free downward swing of the packer, whereby the movement of the carrier is caused to project said packer toward the rear of the box.

20. In a box packing machine, a holder for an empty box, a substantially horizontal shaft arranged in front of the open side of the box and above the lower end thereof, a carrier mounted on said shaft, a packer pivoted to the carrier above the shaft, means for holding the packer elevated above its pivot, means for rotating the shaft in a direction to carry the packer toward the box and a stationary guide arranged to arrest the packer while the carrier continues in movement, whereby the outer portion of the packer is caused to move away from the shaft and enter the box.

21. In a box packing machine, a holder for a box arranged to support the box with one end thereof at a higher elevation than the opposite end, a substantially horizontal shaft arranged to oscillate oppoiste to the open side of the box, a carrier mounted on the shaft in a manner such as to cause its rotation with the shaft but permit movement of the shaft relatively thereto when its movement is arrested, a packer freely pivoted upon the shaft, means for turning the shaft back and forth, said means being normally arranged to hold the shaft and carrier with the pivot of the packer above the shaft, a cam on the shaft engaged with a portion of said packer for holding the same elevated above its pivot, a guide arranged to engage a part of the packer when the shaft is so turned as to move the packer toward the box, said guide being directed toward the box whereby to cause the packer to enter the box when carried by the carrier toward the same, and a stop for arresting the carrier at a given point, the support for the packer being fixed to the shaft and so limited that by further movement of the shaft following arrest of the carrier, said support is displaced from engaging relation to the packer, whereby upon return movement of the shaft and carrier said support is rendered inoperative and the packer is caused to return in a different path from that of its advancing movement.

22. In a packing machine, a carrier, a shaft on which the carrier is frictionally secured in a manner such as to permit movement of the shaft relatively thereto when the carrier is arrested, a packer loosely pivoted upon the carrier and having a stud, and a cam element fixed to the shaft and engaging said stud when the carrier and shaft are in one relative position, the cam being so shaped that by movement of the shaft relatively to the carrier it is shifted out of engagement with said stud.

23. In a packing machine the combination with a holder adapted to support a box or receiver, a packet carrier movable from a receiving position away from the box into a discharging position adjacent to the box, in the course of which movement it approaches the plane of one wall of the box from the direction of the opposite wall, a stop for arresting the carrier in discharging position, and means for shifting said stop whereby the position of arrest of the carrier may be varied with respect to the lower wall of the box.

24. In a packing machine, an article carrier means for moving said carrier back and forth between a receiving position and a discharging position, a stop for arresting the carrier in discharging position, and means operated conjointly with the movement of the carrier for so shifting said stop as to cause the position of the arrest of the carrier to be varied upon successive trips thereof.

25. In a packing machine, the combination of a traveling carrier, means for moving said carrier back and forth between two positions, a shiftable stop arranged to be engaged by a part of said carrier to arrest the same in one extreme position, a cam for shifting said stop, and mechanism for moving said cam step by step upon successive trips of the carrier, said stop being so constructed and arranged that it arrests the carrier in different positions when so shifted.

26. In a packing machine, a shaft, a carrier mounted on said shaft and movable oscillatively by back and forth movements of the shaft, said carrier having a stop element, an endwise movable rod arranged approximately parallel to the shaft, a stop carried by said rod in the path of movement of the carrier stop element, the side of said stop toward which the carrier stop element moves being variously distant at different points from said rod, and means operated by the shaft upon successive oscillations thereof for shifting said stop step by step, whereby different points thereof are brought into the path of the carrier stop element and the carrier is arrested thereby in respectively different positions.

27. A packing machine comprising a support for a box to be filled, a magazine containing a pile of boxes beside the position on said support occupied by the box being filled, and having an outlet in its side toward such position, a feeder mounted to swing under said magazine and above the plane of said support, a carrier constructed and arranged to move toward and away from said box and to place an article therein upon each trip, a cam operable step by step upon successive trips of the carrier and means whereby said cam moves said feeder step by step from the location of the box being filled to a position beyond the opposite side of the magazine, and with a single step from the second position to the first between successive trips of the carrier.

28. In a box filling machine an upright magazine containing a pile of empty boxes, a support for the box to be filled extending under the magazine and to one side thereof, adapted to support a box in filling position beside the magazine, said magazine having an outlet in the side toward such position, a feeder movable under the magazine from the position occupied by the box being filled to a position at the opposite side of the magazine therefrom and being constructed to support the pile of boxes in the magazine when between such positions, and means for giving the feeder a slow movement from the first to the second position while a box is being filled, and a quick movement from the second to the first position for feeding an empty box into the filling position and displacing the filled box.

29. In a box filling machine an upright magazine containing a pile of empty boxes, a support for the box to be filled extending under the magazine and to one side thereof, adapted to support a box in filling position beside the magazine, said magazine having an outlet in the side toward such position, a feeder movable under the magazine from the position occupied by the box being filled to a position at the opposite side of the magazine therefrom and being constructed to support the pile of boxes in the magazine when between such positions, and means for giving the feeder a slow movement from the first to the second position while a box is being filled, and a quick movement from the second to the first position for feeding an empty box into the filling position and displacing the filled box, and a receiver for filled boxes to which the latter are delivered when displaced by the movement of an empty box into position for filling.

30. In a box packing machine in combination with a carrier adapted to deliver articles to a box, a stop for arresting the carrier in delivering position, said stop being adjustable for varying the location of such position, a feeder for placing empty boxes in filling position and simultaneously removing filled boxes, a cam for adjusting said stop and operating said feeder, and means for shifting said cam step by step upon successive trips of the carrier, said cam being constructed to give the feeder a feeding movement between trips of the carrier and to return the feeder into feeding position with a gradual movement while a predetermined number of articles are being placed in the box.

31. In a packing machine, a carrier for articles to be packed, a shaft on which said carrier is mounted, means for oscillating the shaft, a feeder operating cam mounted loosely on said shaft, and means on the shaft for giving said cam a step by step movement in one direction upon successive movements of the shaft in one direction.

32. In a packing machine, a shaft, means for turning said shaft first in one direction and then in the other, a packet carrier mounted on the shaft and movable therewith, a cam loose on the shaft having rigid clutch teeth, a complemental clutch loose on the shaft having a tooth engaging element adapted to slip by the teeth on the cam when turned in one direction and to make positive engagement with said teeth when turned in the other direction, and a pusher fixed on the shaft and traveling between abutments on said complemental clutch, being arranged to engage one abutment upon oscillation in one direction, and the other abutment when moved in the opposite direction, said abutments being separated by a distance less than the complete throw of the pusher, whereby the complemental clutch is moved first in one direction and then in the other and the cam is turned step by step in one direction only upon successive movements of the shaft.

33. A box packing machine including in combination an article carrier, a shaft on which said carrier is mounted and by which it is moved, a pinion on the shaft, a gear segment meshing with the pinion for driving the same, an actuating arm having a cam surface, a stud connected with the segment and engaged with said cam surface, whereby movement of the oscillating arm is adapted to swing the segment in one direction, and an arm connected directly to the segment and arranged to swing the segment in the opposite direction when moved in the same direction as the above described movement of the actuating arm.

In testimony whereof I have affixed my signature.

WILFORD A. HILL.